(12) United States Patent
O'Reirdan

(10) Patent No.: US 9,800,540 B2
(45) Date of Patent: Oct. 24, 2017

(54) SYSTEM AND METHOD FOR PROVIDING SERVICES

(75) Inventor: Michael John Liam O'Reirdan, Riverton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 205 days.

(21) Appl. No.: 13/431,519

(22) Filed: Mar. 27, 2012

(65) Prior Publication Data
US 2013/0263257 A1 Oct. 3, 2013

(51) Int. Cl.
*H04L 29/06* (2006.01)
*H04L 29/12* (2006.01)
*G06F 21/55* (2013.01)

(52) U.S. Cl.
CPC ........ *H04L 61/1541* (2013.01); *G06F 21/552* (2013.01); *H04L 63/1433* (2013.01)

(58) Field of Classification Search
CPC ............. H04L 63/1441; H04L 61/1541; H04L 63/1433; G06F 21/10; G06F 21/552
USPC ...................................................... 726/22, 24
See application file for complete search history.

(56) References Cited

U.S. PATENT DOCUMENTS

| | | | | |
|---|---|---|---|---|
| 5,898,780 A | * | 4/1999 | Liu | H04W 12/06 705/18 |
| 2002/0116639 A1 | * | 8/2002 | Chefalas | G06F 21/56 726/24 |
| 2002/0162027 A1 | * | 10/2002 | Itwaru | 713/201 |
| 2003/0005163 A1 | * | 1/2003 | Belzile | 709/249 |
| 2003/0210699 A1 | * | 11/2003 | Holt et al. | 709/223 |
| 2007/0061488 A1 | * | 3/2007 | Alagappan et al. | 709/246 |
| 2007/0143392 A1 | * | 6/2007 | Choe et al. | 709/203 |
| 2008/0196104 A1 | * | 8/2008 | Tuvell et al. | 726/24 |
| 2009/0006575 A1 | * | 1/2009 | Hulten | G06F 21/577 709/207 |

\* cited by examiner

*Primary Examiner* — Brandon Hoffman
*Assistant Examiner* — Thong Truong
(74) *Attorney, Agent, or Firm* — Ballard Spahr LLP

(57) ABSTRACT

Systems and methods for providing services are disclosed. One aspect comprises detecting a compromised state of a user device, determining a device identifier associated with the user device, locating a service identifier the device identifier, and transmitting the service identifier to the user device.

20 Claims, 5 Drawing Sheets

SYSTEM AND METHOD FOR PROVIDING SERVICES

BACKGROUND

Systems and software offered by a service provider may be used to detect compromised devices on a particular network. However, if a compromised device or service is detected by a third-party, the third party may not have information, such as the service offered or the service provider associated with the particular compromised device. Accordingly, the third-party may reject interactions with the compromised device or service without providing a resolution. These and other shortcomings are identified and addressed by the disclosure.

SUMMARY

It is to be understood that both the following general description and the following detailed description are exemplary and explanatory only and are not restrictive, as claimed. Provided are methods and systems for providing services. The methods and systems described herein, in one aspect, can direct a compromised user device to a location for remediation services.

In an aspect, some methods can comprise detecting a compromised state of a user device, determining a device identifier associated with the user device, locating a service identifier based upon the detected compromised state of the user device and the device identifier, and transmitting the service identifier to the user device.

In another aspect, methods can comprise detecting a compromised user device, locating a user identifier associated with the compromised user device, identifying a service provider based upon the user identifier, locating a remediation service identifier associated with the service provider, and transmitting the remediation service identifier to the compromised user device.

In another aspect, some systems can comprise a memory for storing a plurality of user identifiers. A processor can be in communication with the memory, the processor configured for: detecting a compromised user device, locating one of the plurality of user identifiers associated with the user device, identifying a service provider based upon the user identifier, locating a remediation service identifier associated with the service provider, and transmitting the remediation service identifier to the compromised device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
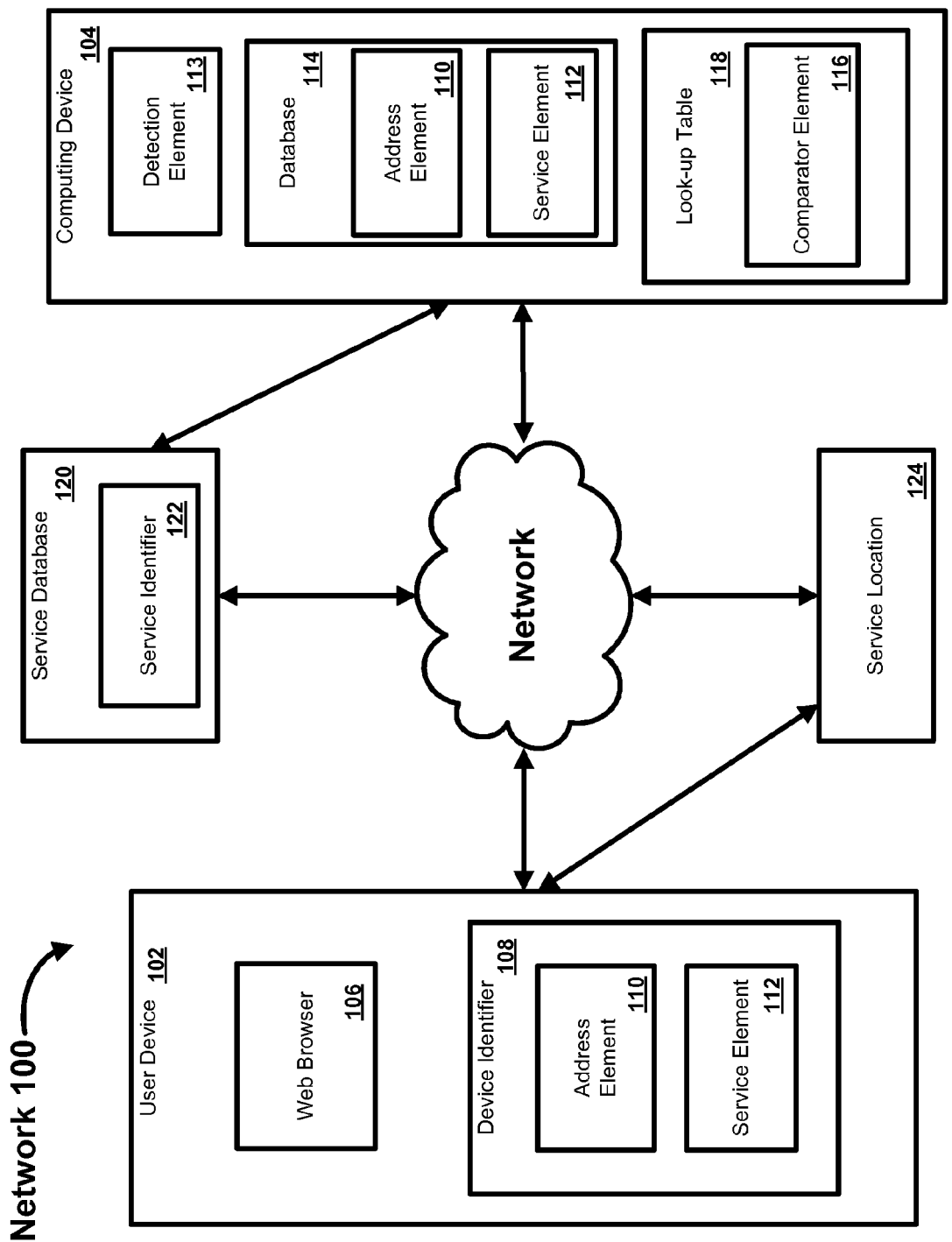
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, in one aspect of the disclosure, a system can be configured to provide services such as remediation service to a user device. FIG. 1 illustrates various aspects of an exemplary network in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network 100 can comprise a user device 102 in communication with a computing device 104 such as a server, for example. The computing device 104 can be disposed locally or remotely relative to the user device 102. As an example, the user device 102 and the computing device 104 can be in communication via a private or public network such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a web browser 106 for providing an interface to a user to interact with the user device 102 and/or the computing device 104. The web browser 106 can be any interface for presenting information to the user and receiving a user feedback such as Internet Explorer, Mozilla Firefox, Google Chrome, Safari, or the like. Other software, hardware, and/or interfaces can be used to provide communication between the user and one or more of the user device 102 and the computing device 104. As an example, the web browser 106 can request or query various files from a local source and/or a remote source.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vise versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources such as data, devices, and files.

In an aspect, the computing device 104 can comprise a detection element 113 for detecting a device and/or a state of a device such as the user device 102. As an example, the detection element 113 can comprise software for detecting a compromised user device or a compromised state of a device that is communicating or requesting communication with the computing device 104. As a further example, the detection element 113 can be passive or active and can compare interactions and behavior of the user device 102 to historical data or comparative data to determine an abnormal state or compromised state of the user device 102. In an aspect, a compromised user device may be under automated control of a bot (e.g., software applications that run automated tasks) or virus, causing the user device to behave abnormally (e.g., abnormal queries and requests of the computing device 104). As such, the detection element 113 can detect the abnormal behavior and identify the device as a compromised user device. In an aspect, a compromised smartphone may request a connection with a service or device, whereby the recipient of the request can detect the compromised state (e.g., a virus, an outdated version of operating software, fraudulent activity, abnormal location, etc.) of the smartphone. In another aspect, an on-board vehicle device of a vehicle may request information or connection with a computing device (e.g., on-board or remote), whereby the computing device can detect a compromised state (e.g., vehicle condition, sensor errors, maintenance request) of the on-board vehicle device, such as an electronic control module in communication with a manufacturer's server. Other techniques, methods, and systems for detecting abnormal or compromised devices can be used. For example, externally provided intelligence can be used to indicate that a particular device trying to establish a connection is compromised.

In an aspect, the computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, the computing device 104 can comprise a comparator element 116. It is understood that the comparator element 116, as well as other elements, can be stored locally or remotely relative to the computing device 104. As an example, the comparator element 116 can be stored in the database 114. As a further example, the comparator element 116 can be stored in a look-up table 118. In an aspect, the comparator element 116 can comprise one or more of a value, token, character, character string, label, classifier, pre-determined time period, pre-determined date, time range, finite expression, or the like. The comparator element 116 can comprise single or multiple characters, character strings, ranges, thresholds, values, and the like, for comparison. The comparator element 116 can be based upon a pre-defined user level, user authority, user history, user location, or other classification or distinction.

As an example, one or more of the user device 102 and the computing device 104 can be configured to use or access authentication information of the comparator element 116 to authenticate a user device. As a further example, the comparator element 116 can be utilized by the detection element 113 to determine a state of a user device based upon stored information. Other information such as data relating to particular user devices and/or users can be stored in the look-up table 118 and retrieved to perform operations such as queries and the like. As an example, information relating to the user device 102 can be retrieved to query locator data for particular services for the user device 102.

In an aspect, a service database 120 can be in communication with the computing device 104. As an example, the service database 120 can comprise a domain name system server. As a further example, the service database 120 can comprise information relating to one or more services and/or service providers. In another aspect, the service database 120 can comprise one or more service identifiers 122. As an example, the service identifiers 122 can comprise records such as text records for identifying a location of a particular service (e.g., service location 124). In an aspect, one or more service identifiers 122 can comprise locator information relating to remediation services offered by one or more service providers (e.g., Internet service providers). As an example, one or more service identifiers 122 can comprise a uniform resource identifier (URI) or uniform resource locator (URL). Other information can be stored in and retrieved from the service database 120. The service database 120 can be located remotely from the computing device.

The service location 124 can comprise devices, systems, software, and other resources for providing services (e.g., remediation services) to the user device 102 and other devices. As an example, the service location 124 can be a network location (e.g., identified by a URL). However, the service location 124 can be a physical or virtual location. In an aspect, a service provider can offer certain service via the service location 124, whereby devices associated with the service provider can navigate to the service location 124 for accessing the certain service.

Figure 2:
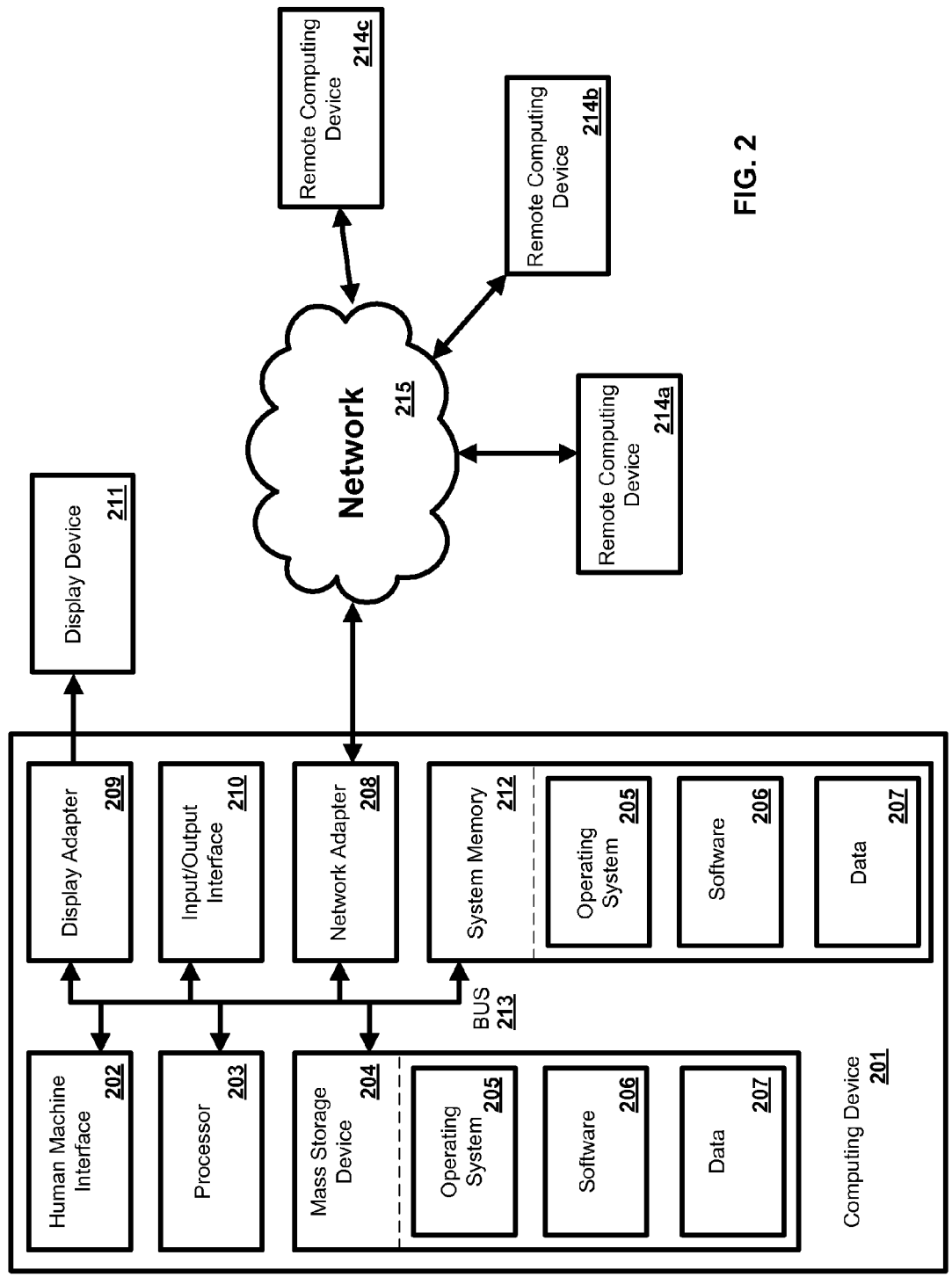
FIG. 2 is a block diagram of an exemplary computing device.

In an exemplary aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, software 206, data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as data 207 and/or program modules such as operating system 205 and software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and software 206. Each of the operating system 205 and software 206 (or some combination thereof) can comprise elements of the programming and the software 206. Data 207 can also be stored on the mass storage device 204. Data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

As described in greater detail below, provided are methods for providing services to a user and/or user device. As an example, remediation services can be provided to a compromised user device by directing the compromised user device to a service location.

Figure 3:
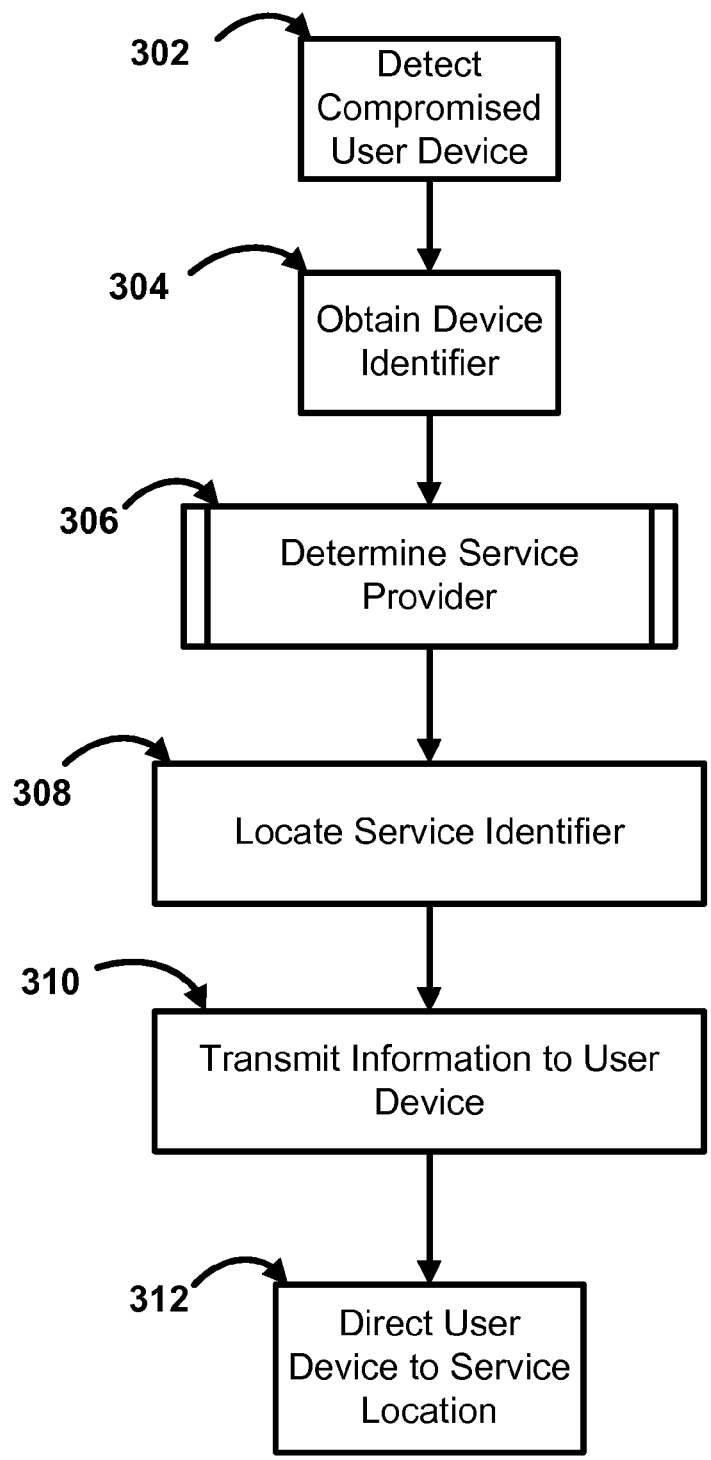
FIG. 3 is a flow chart of an exemplary method.

FIG. 3 illustrates an exemplary method for identifying a class of user. The method illustrated in FIG. 3 will be discussed, for example only, in reference to FIGS. 1-2. In step 302, the user device 102 can be detected. As an example, the user device 102 may request access to a particular resource, computer, or network. Accordingly, a detection element (e.g., detection element 113) can analyze the user device 102 or aspects of the user device 102 to determine if the user device 102 is compromised. As a further example, the detection element can compare interactions and behavior of the user device 102 to historical data or comparative data to determine an abnormal state or compromised state of the user device 102. Other techniques, methods, and systems for detecting abnormal or compromised devices, e.g., detecting a virus, can be used.

In step 304, the device identifier 108 associated with the user device 102 can be obtained. As an example, the user device 102 may request access to a particular resource, computer, or network. Accordingly, a detection element (e.g., detection element 113) or other element/software can analyze the user device 102 or aspects of the user device 102 to obtain the device identifier 108. As an example, when the user device 102 connects to the computing device or requests connection to the computing device 104, the computing device 104 can obtain the device identifier 108 from the user device 102, or proxy of the user device 102. As a further example, the computing device 104 may obtain the device identifier 108 by obtaining the address element 110 (e.g., IP address assigned to the user device 102). Other information relating to the user device 102 can be obtained by the computing device directly or via retrieval and lookup.

In step 306, a service provider (e.g., Internet or other network service provider) associated with the user device 102 can be determined. As an example, the device identifier 108 can be used to locate or determine information relating to the service provider associated with the user device 102. As a further example, the device identifier 108 can comprise the service element 112 including information relating to one or more service providers, which may be public or private network service providers.

Figure 4:
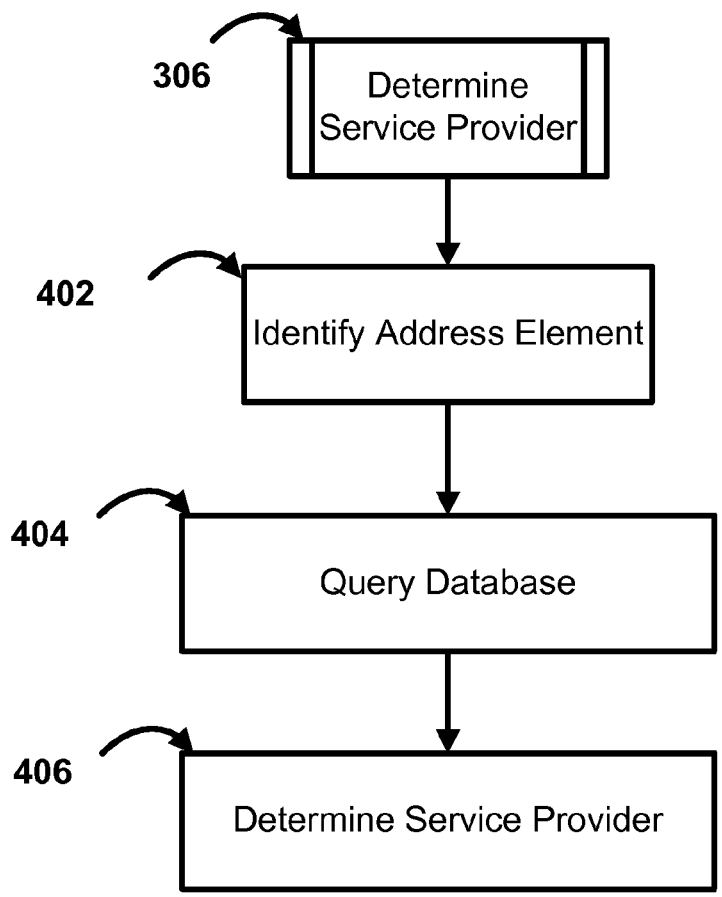
FIG. 4 is a flow chart of an exemplary method.

In an aspect, FIG. 4 illustrates an exemplary method for determining the service provider (FIG. 3, 306). The method illustrated in FIG. 4 will be discussed, for example only, in reference to FIGS. 1-2. In step 402, the address element 110 (e.g., IP address assigned to the user device 102) can be identified. The address element 110 can be retrieved directly from the user device or determined based upon information relating to the user device 102 (e.g., device identifier 108).

In step 404, the address element 110 or information relating to the user device 102 is used to query a database or storage medium. As an example, the address element 110 can be used to query the database 114 to retrieve further information relating to the user device 102. As a further example, the database 114 can comprise records relating to one or more users and/or user devices. By querying the database 114 based upon information particular to the user device 102, a record can be retrieved for the particular user device 102. The record or collection of information can comprise information such as user information, device specifics, and services or service providers (e.g., service element 112).

In step 406, information relating to a service provider is retrieved from the database 114. As an example, service element 112 may be retrieved from the database 114 and analyzed to extract information relating to the service provider(s) associated with the user device 102. As a further example, other information can be used, retrieved and/or analyzed to determine the service provider associated with the compromised device.

Returning to FIG. 3, a service identifier or locator can be located at step 308. In an aspect, once a particular service provider has been identified (step 306), the computing device 104 can locate information (e.g., service identifier 122) relating to a service to be rendered to the user device 102. As an example, the computing device 104 can retrieve service records, identifiers, locators (e.g., service identifier 112) from a domain name system server or database. As an example, the service identifiers 122 can be retrieved and information can be extracted relating to services (e.g., remediation services) offered by one or more service providers (e.g., Internet service providers). As an example, one or more service identifiers 122 can comprise a uniform resource identifier (URI) or uniform resource locator (URL) relating to the service location 124.

Figure 5:
FIG. 5 is an exemplary service identifier message.

In step 310, information such as one or more service identifiers 122 can be transmitted to the user device 102. As an example, information can be transmitted to the user device 102 and rendered on the user device 102 as an alert or notice 500, as shown in FIG. 5. As a further example, the alert or notice 500 can comprise a URL 502 identifying the service location 124. As an example, the notice 500 can direct a user of the user device 102 to a particular service center (e.g., virtual or physical) such as the service location 124 associated with the particular need of the user device. As a further example, where the user device 102 requires software updates, an update service location can be provided. Similarly, where a virus service is required, the user device 102 can be directed to a virus services location. In an aspect, characteristics of the user device 102, such as make, model, location, and/or version (e.g., represented by the device identifier 108 or other related data store), or other characteristic such as time or date, can be used to identify the appropriate service location. In an aspect, the user device 102 can be directed or re-directed (e.g., automatically) to the service location 124, as shown in step 312. In a further aspect, service can automatically be provided to the user device 102 without further action on behalf of the user.

Figure 6:
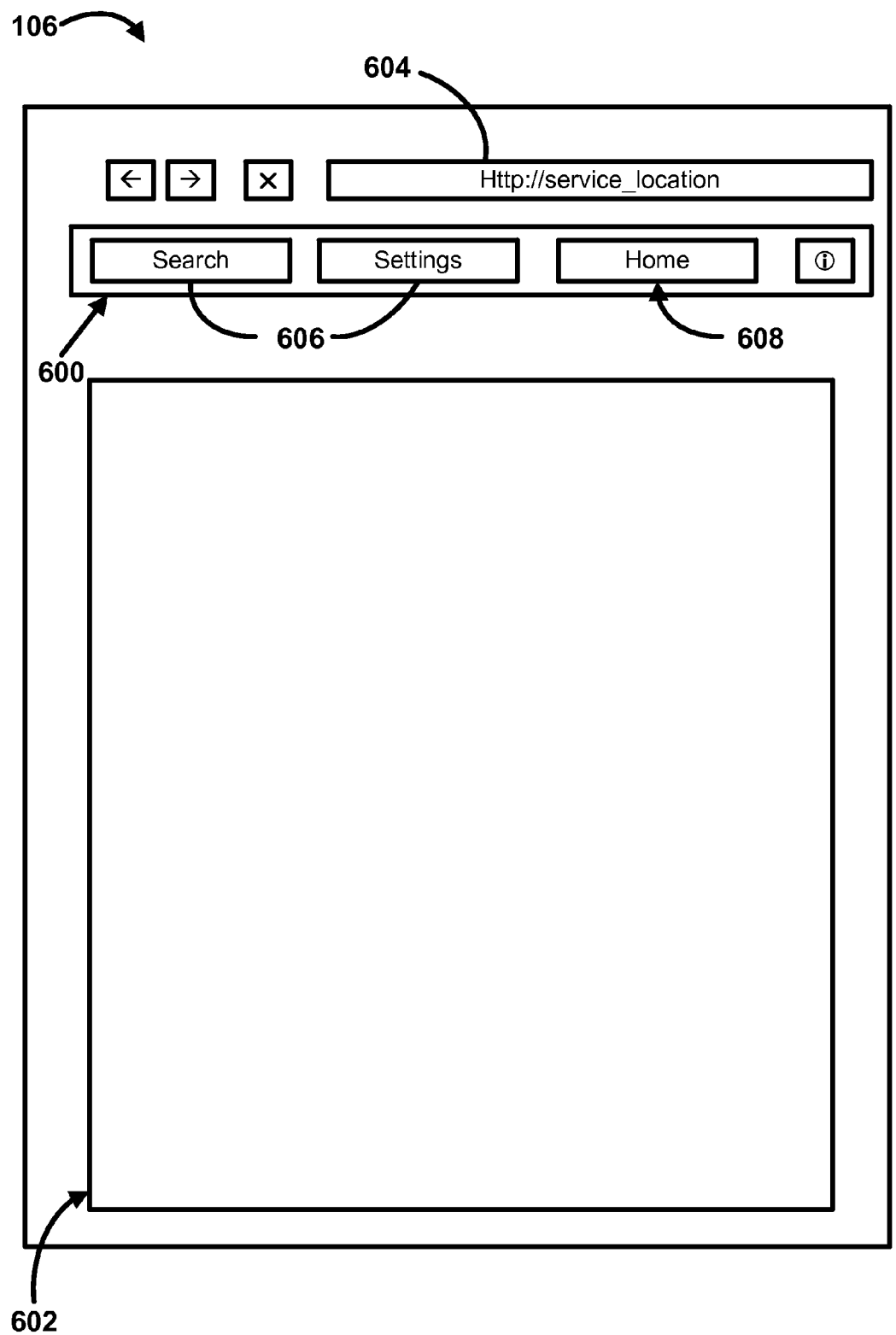
FIG. 6 is a representation of an exemplary web browser.

In an aspect, software can be used to implement methods of providing services. As described in greater detail below, the methods and systems can comprise a software interface 600, as illustrated in FIG. 6. By way of example, the interface 600 can be integrated with the web browser 106. As a further example, the interface 600 can be loaded to the user device 102 as an add-on software package. In an aspect, the loading of the interface 600 can be tracked in order to identify the user devices that comprise the interface 600.

The methods and systems disclosed can utilize one or more interfaces 600 to perform one or more functions in one or more locations. FIG. 6 illustrates an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

In an aspect, the web browser 106 can comprise a browser window 602 for displaying information (e.g. web pages, files, etc.) to the user. As an example, the web browser 106 can comprise an address bar 604 or URL bar to allow a user to input a URL for directing the requests of the web browser 106. In an aspect, the interface 600 can be a toolbar disposed adjacent the address bar 604 of the web browser 106 and including one or more user interface elements, buttons, or engageable menus. The interface 600 can be presented to the user in any position, form, and environment. As an example, the interface 600 can comprise a plurality of user interface elements such as user-engageable buttons 606 for executing various associated functions (e.g. search function, settings modification, and the like.)

In an aspect, the interface 600 can comprise a user interface element, such as home button 608 or a homepage button for directing the web browser 106 to a pre-defined file or webpage associated with the home button 608. As an example, the service location 124 can be associated with the home button 608, whereby a selection of the home button 608 causes the web browser 106 to request a particular file or direct the user device 102 to the service location 124.

As an example, a user and/or user device can rely on a network connectivity provided by a particular service provider to navigate to a third party site (e.g., bank website, merchant website, service website, e-commerce site, etc.). In an aspect, the third party site can be configured to detect a compromised user device. However, since the third party is not the provider of the network connectivity, the third party can often not provide direct remediation of the detected compromised device. Conventional solutions included a complete block of the compromised device from interacting with the third party site. Now, using the systems and methods described herein, the third party can use information associated with the compromised device to locate the service provider and redirect the user and/or user device to remediation service offered by the service provider. Any third party site or service can be configured to operate as described herein.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   detecting a compromised state of a user device;
   determining a device identifier associated with the user device from a plurality of device identifiers;
   determining, based on the determined device identifier, an address element associated with the user device;
   determining, based on the address element, a service provider associated with the user device, wherein the service provider is determined from a plurality of service providers, and wherein at least one of the plurality of service providers is an Internet Service Provider;
   determining, based on the service provider and the compromised state of the user device, a service identifier, wherein the service identifier identifies a server associated with the determined service provider; and
   transmitting the service identifier to the user device.

2. The method of claim 1, wherein the determined one of the plurality of device identifiers comprises information relating to one or more of a manufacturer, a model, a type of device, and a class of the user device, and wherein a user identifier is used to locate the service identifier.

3. The method of claim 1, wherein the service identifier comprises a uniform resource locator of the server associated with the determined service provider.

4. The method of claim 1, wherein the service identifier is stored at a domain name system server.

5. The method of claim 1, further comprising alerting a user of the user device of the compromised state of the user device.

6. The method of claim 1, further comprising automatically directing the user device to a service location based upon the service identifier.

7. A method comprising:
   detecting a compromised user device;
   determining a user identifiers associated with the compromised user device from a plurality of user identifiers;
   determining, based on the determined user identifier, an address element associated with the compromised user device;
   determining, based on the determined address element, a service provider from a plurality of service providers, wherein at least one of the plurality of service providers is an Internet Service Provider (ISP);
   determining, based at least in part on a compromised state of the compromised user device, a remediation service identifier associated with the determined service provider, wherein the remediation service identifier identifies a server associated with the service provider; and
   transmitting the remediation service identifier to the compromised user device.

8. The method of claim 7, wherein the determined user identifier of the plurality of user identifiers comprises an internet protocol address.

9. The method of claim 7, wherein the remediation service identifier is stored as a text record.

10. The method of claim 7, wherein the remediation service identifier comprises a uniform resource locator associated with an online remediation service.

11. The method of claim 7, wherein the remediation service identifier is stored at a domain name system server.

12. The method of claim 7, further comprising alerting a user of the compromised user device of the compromised state of the comprised user device.

13. The method of claim 7, further comprising automatically directing the compromised user device to a remediation service based upon the remediation service identifier.

14. An apparatus comprising:
   one or more processors; and
   a memory comprising processor executable instructions that, when executed by the one or more processors, cause the apparatus to:
   detect a compromised user device;
   determine a user identifier associated with the compromised user device from the plurality of user identifiers;
   determine, based on the determined user identifier, an address element associated with the compromised user device;
   determine, based on the address element, a service provider associated with the compromised user device from a plurality of service providers, wherein at least one of the plurality of service providers is an Internet Service Provider (ISP);
   determine, based on the determined service provider and a compromised state of the compromised user device, a remediation service identifier, wherein the remediation service identifier identifies a server associated with the determined service provider; and
   transmit the remediation service identifier to the compromised device.

15. The apparatus of claim 14, wherein the determined user identifier of the plurality of user identifiers comprises an internet protocol address.

16. The apparatus of claim 14, wherein the remediation service identifier is stored as a text record.

17. The apparatus of claim 14, wherein the remediation service identifier comprises a uniform resource locator associated with an online remediation service.

18. The apparatus of claim 14, wherein the remediation service identifier is stored at a domain name system server.

19. The apparatus of claim 14, wherein the processor executable instructions, when executed by the one or more processors, further cause the apparatus to alert a user of the compromised user device of the compromised state of the compromised use device.

20. The apparatus of claim 14, wherein the processor executable instructions, when executed by the one or more processors, further cause the apparatus to automatically direct the compromised user device to a remediation service based upon the remediation service identifier.

* * * * *